(12) United States Patent
Gunasekara et al.

(10) Patent No.: US 8,301,130 B1
(45) Date of Patent: Oct. 30, 2012

(54) DETECT AND CONNECT WIRELESS PHONE SERVICES AND LOCAL PHONE NETWORKS

(75) Inventors: Don Gunasekara, Reston, VA (US); Shane David Chapman, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 1235 days.

(21) Appl. No.: 11/832,842

(22) Filed: Aug. 2, 2007

(51) Int. Cl.
*H04M 3/00* (2006.01)

(52) U.S. Cl. ........ 455/418; 455/416; 455/417; 455/419; 455/420; 379/207.16; 379/211.01; 379/211.02; 379/211.04

(58) Field of Classification Search .......... 455/416–420; 379/207.16, 211.01, 211.02, 211.04
See application file for complete search history.

(56) References Cited

U.S. PATENT DOCUMENTS

| | | | |
|---|---|---|---|
| 2005/0143054 A1* | 6/2005 | Fogel | 455/415 |
| 2007/0143397 A1 | 6/2007 | Guedalia et al. | |
| 2008/0075245 A1* | 3/2008 | Pearson et al. | 379/88.13 |
| 2008/0192655 A1* | 8/2008 | Vagelos | 370/259 |

OTHER PUBLICATIONS

Non-Final Office Action of U.S. Appl. No. 11/870,520, mailed Jun. 7, 2011.
Non-Final Office Action mailed Feb. 13, 2012 re U.S. Appl. No. 11/870,520, 15 pgs.

\* cited by examiner

*Primary Examiner* — Dwayne Bost
*Assistant Examiner* — Yungsang Lau

(57) ABSTRACT

An electronic device, referred to as a beacon gateway, capable of communicating an incoming call on one phone to a second phone operating on a different telecommunications network is described herein. A landline phone, voice-over-Internet-protocol phone (VOIP phone), cable phone, and mobile phone may be connected to the beacon gateway. When one of the phones receives an incoming call, the beacon gateway rings the other phones with ring tones indicative of the receiving phone. Additionally, a user can elect to make a phone call across one network (e.g., wireless) from a phone that communicates calls across a different network (e.g., landline). Moreover, a thin client operating in a mobile device is configured to handle communicating inbound calls and outgoing calls on mobile device to other phones connected to the beacon gateway.

20 Claims, 3 Drawing Sheets

DETECT AND CONNECT WIRELESS PHONE SERVICES AND LOCAL PHONE NETWORKS

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

One aspect of the invention is directed to a platform capable of communicating an incoming an outgoing calls on multiple phones operating over different telecommunications networks. The phones are connected to a beacon gateway, which is configured to transmit outgoing calls over a desired network and allow users to answer incoming calls to a specific phone on any phone connected to the beacon gateway. For instance, a landline phone, voice-over-Internet-protocol phone (VOIP phone), cable phone, and mobile phone may be connected to the beacon gateway. When one of the phones receives an incoming call, the beacon gateway rings the other phones with ring tones indicative of the receiving phone.

In another aspect, the platform enables a user to make a phone call across one network (e.g., wireless) from a phone that communicates calls across a different network (e.g., landline). To make an outgoing call, the user can select a dial tone unique to a desired phone connected to the beacon gateway and dial a phone number. The beacon gateway is configured to pass the outgoing call through the selected phone network. Specific ring tones and dial tones are provided by a tones generator operating in the beacon gateway's software.

Moreover, in another aspect of the present invention a thin client operating in a mobile device is configured to handle communicating inbound calls and outgoing calls on phones connected to the beacon gateway. The thin client may be configured to notify the beacon gateway when the mobile device is in communication. In addition, the thin client transmits and receives incoming and outgoing calls to or from the phone connected to the beacon gateway.

BRIEF DESCRIPTION OF THE SEVERAL VIEWS OF THE DRAWINGS

The present invention is described in detail below with reference to the attached drawing figures, wherein.

DETAILED DESCRIPTION

Figure 1:
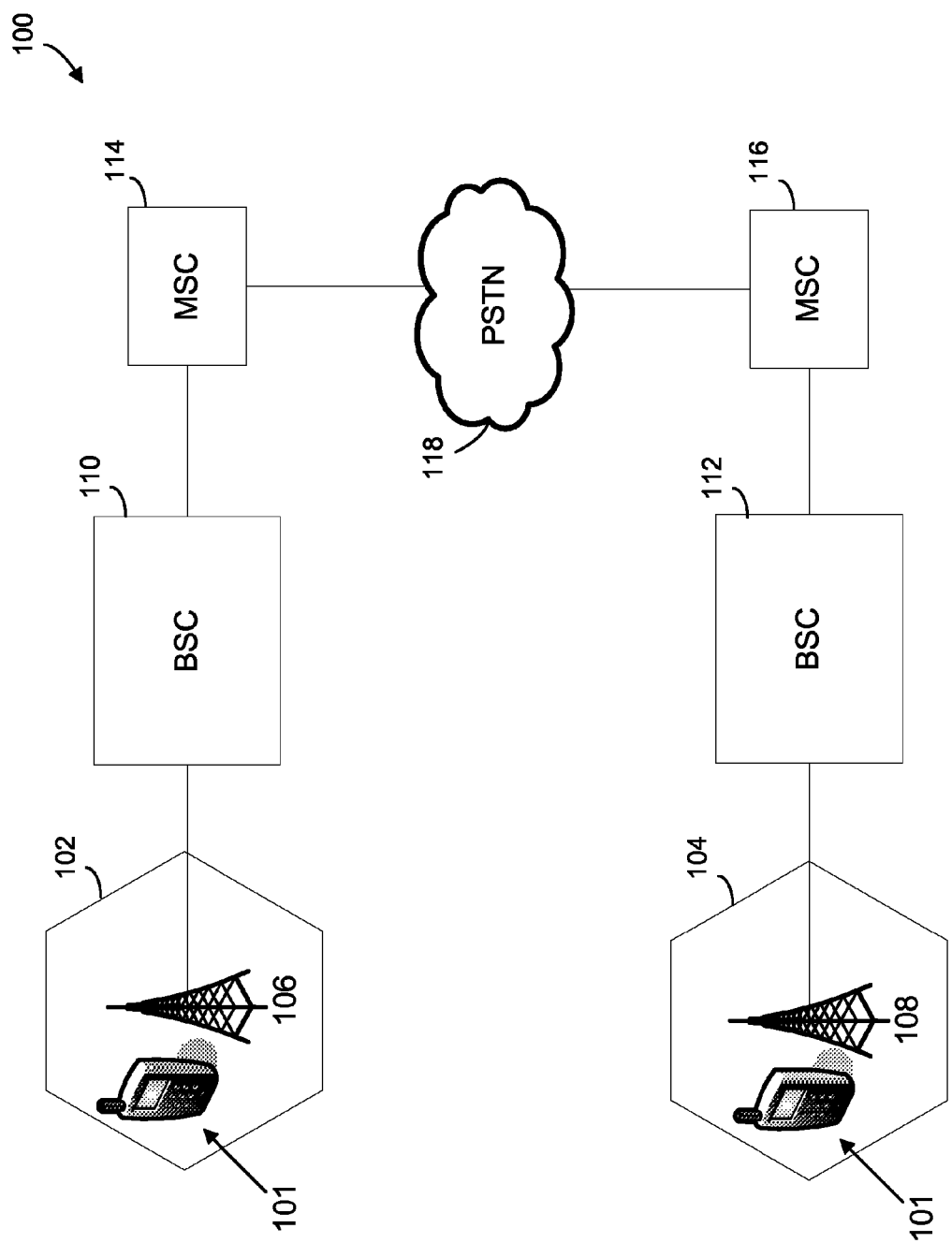
FIG. 1 is a block diagram of a wireless network, according to an embodiment of the present invention.

The subject matter described herein is presented with specificity to meet statutory requirements. The description herein, however, is not intended to limit the scope of this patent. Rather, it is contemplated that the claimed subject matter might also be embodied in other ways, to include different steps or combinations of steps similar to the ones described in this document, in conjunction with other present or future technologies. Moreover, although the term "block" may be used herein to connote different elements of methods employed, the term should not be interpreted as implying any particular order among or between various steps herein disclosed.

Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to, random access memory (RAM), read-only memory (ROM), electrically erasable programmable read-only memory (EEPROM), flash memory used independently from or in conjunction with different storage media, such as, for example, compact-disc read-only memory (CD-ROM), digital versatile discs (DVD), holographic media or other optical disc storage, magnetic cassettes, magnetic tape, magnetic disk storage, or other magnetic storage devices. These memory components can store data momentarily, temporarily, or permanently. In operation, communications media typically store computer-useable instructions.

The invention can generally be described as a platform for detecting and connecting wireless phone services with local phone services. For example, a house may be outfitted with a landline phone, a voice over internet protocol (VOIP) phone, and a cable phone, while the owner of the house also owns a cellular phone that communicates across a wireless network. In one embodiment of the present invention, a beacon gateway is configured to receive a call coming in to any of the phones, ring the other phones, and allow a user to answer the call on a different phone system. For example, an incoming call on the wireless network would be detected by the beacon gateway, which, in turn, would ring the landline phone, VOIP phone, and cable phone. One could then answer the incoming wireless call on any of the other phones connected to the beacon gateway.

In another embodiment of the present invention, the beacon gateway is configured to pass outgoing calls made on one phone to any other connected phone. This allows a user to choose which phone network an outgoing call should go through, regardless of the phone used to make the call. For example, the user may choose to call from the landline phone but have the call transmitted through the wireless network. In another example, the user may make a call across a VOIP network using the wireless phone.

As one skilled in the art will appreciate, the beacon gateway may be connected to a number of phone networks. Examples include, without limitation, a wireless network, landline, cable network, or packet-switching network (such as to facilitate a call on a VOIP phone). In one embodiment, phone calls through a landline, VOIP connection, or wireless tower are received by a beacon gateway, which is configured to transmit the calls to other phones connected to the gateway. For instance, a call to a cellular phone may be passed through the gateway to a VOIP phone, enabling the user to answer the call with the VOIP phone. In addition, the beacon gateway is also configured to pass outgoing calls through phone systems not supported by a particular phone. For example, a call made on a landline phone could be made over a cellular or VOIP network. Additionally, the user can select a one of the phones connected to the beacon gateway by cycling through different dial tones or selecting an icon on a mobile device. An outgoing call can then be sent across the network associated with the phone selected by the user by passing the call through the beacon gateway.

A landline, as referred to herein, refers to a terrestrial, switch network. Landlines may include, for example, networks of twisted pair, coaxial, hybrid-fiber, or fiber cables. Typically landlines service home or business phones. One skilled in the art will appreciate the numerous components and inner-workings of landlines.

Having generally described various embodiments of the invention, attention is turned to an exemplary wireless phone network capable of being interconnected to the beacon gateway. Referring to FIG. 1, a block diagram of a wireless network 100 is shown, according to an embodiment of the present invention. In a typical wireless network, an area is divided geographically into a number of cell sites 102 and 104. Each cell site (102 and 104) can be defined by an RF radiation pattern from a respective base transceiver station (BTS) antenna, illustrated as towers 106 and 108. Each cell site may include one or more sectors (not shown for clarity). Each tower 106 and 108 can transmit and receive wireless communications to and from a plurality of mobile devices—as illustrated by mobile devices 101—that enter into cell sites 102 and 104, respectively.

Typically, digital cellular architectures include base transceiver station (BTS) towers. In some embodiments, base station controllers (BSCs), depicted as BSC 110 and 112, are incorporated to control groups of BTS towers. In operation, BSCs 110 and 112 function to control communications via one or more BTS towers. For example, a BSC may control the power level of wireless signals emitted by towers 106 and 108, while also controlling the handoff of communications as the mobile devices 101 moves between sectors within a BTS coverage area.

In an embodiment, BSC 110 and 112 are coupled to mobile switching centers (MSC) 114 and 116, which include a switch or a packet gateway. Also, BSC 110 and 112 may also be coupled to a packet gateway (not shown), such as a packet data serving node (PDSN). In another embodiment, MSC 114 and 116 are coupled to one or more networks, such as public switched telephone network (PSTN) 118, and, in operation, manage voice sessions between mobile devices 101.

When a sender positions mobile device 101 in cell 102, mobile device 101 communicates via an RF air interface with tower 106. As a result, a communication path is established via the air interface, tower 106, BSC 110, and the switch or gateway (i.e., MSC 114, a PDSN, or the like). Mobile device 101 may then communicate with tower 106 using a variety of different protocols. For example, in a time division multiple access (TDMA) system, tower 106 typically communicates on a group of frequencies (e.g., 800 MHz, 900 MHz, 1900 MHz ranges), and each frequency may itself carry at least one multiplexed call or data session. In a code division multiple access (CDMA) system, by comparison, tower 106 communicates over a spread spectrum of frequencies, and the spectrum may carry many multiplexed calls and/or data sessions. Typical components for CDMA and TDMA systems are generally well known to those skilled in the art.

Additionally, Personal Communications Service (PCS) technology may also be used to communicate RF signals for mobile device 101. As one of ordinary skill in the art will understand, PCS is a low-powered, high-frequency alternative to traditional cellular technologies and operates in the 1800-2000 MHz band. Traditionally, PCS uses both microcell and picocell architectures, meaning the coverage areas are quite small (e.g., one mile), which reduces the amount of power needed. Functionally, a PCS network performs virtually the same functions in nearly the same ways as a typical cellular network, with key differences in frequency ranges, coverage areas, and power levels. PCS technologies may use CDMA, digital Advanced Mobile Phone System (AMPS), or Global System for Mobile communications (GSM) capabilities.

MSC 114 and 116 may be coupled to one or more networks to manage telecommunication sessions between mobile devices 101, such as PSTN 118. PSTN 118 is a network of public circuit-switched telephone networks supports the communication of phone calls. One skilled in the art will appreciate that PSTN 118 may include, in part, local and interexchange trunks, transport equipment, exchanges, switching nodes, transmission nodes, and service nodes. In one embodiment, PSTN 118 adheres to technical standards created by the International Telecommunication Union Telecommunication Standardization Sector (ITU-T) and uses E.163/E.164 addresses (known more commonly as telephone numbers) for addressing.

FIG. 1 is provided merely for illustrative purposes. One skilled in the art will understand that embodiments described herein will also incorporate other telecommunication networks to communicate phone calls to different types of phones. For example, a landline phone may utilize a system of local and main exchanges to relay a call. A VOIP phone may relay phone calls through packets (i.e., packet switching), instead of circuit switching. In some embodiments, phone calls, or Internet data, are transmitted across a Worldwide Interoperability for Microwave Access (WiMAX) network based on the IEEE 802.16 standard or, in other embodiments, a wireless fidelity (Wi-Fi) network based on the IEEE 802.11 standard.

Additionally, VOIP phones may necessitate an analog-to-digital converter—such as an analog telephone adapter (ATA)—or an Ethernet connection to transmit calls. Moreover, a cable phone may be interconnected to a set-top box that is configured to pass phone calls across cable hybrid-coaxial networks. One skilled in the art will understand that various well-known components, protocols, and devices may also be used to transmit calls between different types of phones.

Phone calls may be made using any well-known method. For example, dual-tone multi-frequency (DTMF)—commonly referred to as "touch tone"—signaling may be used to communicate numbers in embodiments described herein. DTMF signaling typically communicates pressed numbers to an MSC. For example, a DTMF keypad may be laid out in a 4×4 matrix, with each row representing a low frequency, and each column representing a high frequency. Pressing a single key such as '1' will send a tone with frequencies at 697. Hz and 1209 Hz. Resultant tones may be decoded using any number of well-known techniques. Alternatively, calls from the mobile device 101 may not actually send DTMF signals across an RF network, but rather may be configured to send digital data grams mapped to DTMF tones that are later restored when a call enters the PSTN 118.

Figure 2:
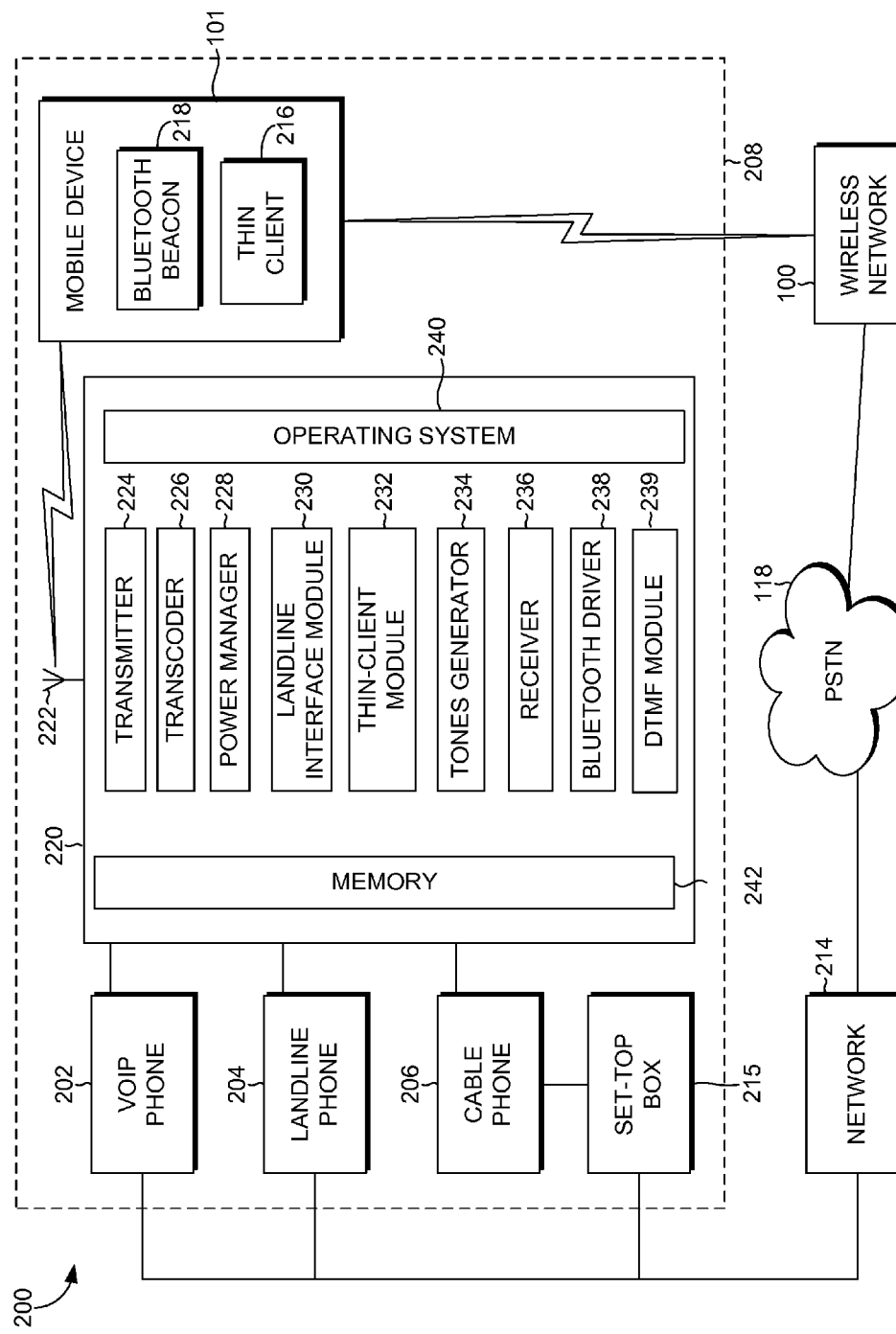
FIG. 2 is a block diagram depicting a networking architecture for interconnecting multiple phones to a beacon gateway, according to an embodiment of the present invention.

Turning now to FIG. 2, a block diagram is illustrated depicting a networking architecture 200 for interconnecting multiple phones to a beacon gateway, according to an embodiment of the present invention. Networking architecture 200 is merely an example of one suitable networking environment and is not intended to suggest any limitation as to the scope of use or functionality of the present invention. Neither should networking architecture 200 be interpreted as having any dependency or requirement related to any single component or combination of components illustrated therein.

In general, networking architecture 200 illustrates a structure, such as a house or an office, which communicates phone calls through different phone systems. For clarity, the structure will be described herein as a house 208; however, embodiments are not limited to any particular physical structure. The house 210 may be outfitted with several phones, such as a VOIP phone 202, landline phone 204, cable phone 206, and mobile device 101 (described above). In alternative embodiments, the house 208 may also include other well-known phone systems. Furthermore, the dotted line designating the house 210 is not necessarily a physical boundary. For instance, the mobile device 101 may be carried outside of the physical boundaries of the house 208 and still configured to work according to embodiments described herein.

Each phone in the house 208 is configured to communicate across one or more telecommunication networks. In one embodiment, the mobile device 101 communicates calls, messages, and other transmissible data using the wireless network 100 (described above). The VOIP phone 202, landline phone 204, and cable phone (through a set-top box 215, in one embodiment) also communicate calls and messages through PSTN 118; however, these phones may route calls through a telecommunication network 214 instead of the wireless network 100. The telecommunications network 214 may include any well-known interfacing components to the PSTN 118—such as those previously mentioned (e.g., local and main exchanges, analog-to-digital converters, Ethernet connections, or coaxial-cable networks). One skilled in the art will appreciate that various interfacing components may be utilized to connect any of the three phones to the PSTN 118.

Each phone (including the mobile device 101) is coupled to the beacon gateway 220. Coupling may occur via an actual wire connected to the beacon gateway 220 with registered jacks (RJ), or the phones may be coupled to the beacon gateway via a wireless connection, such as Bluetooth, Wi-Fi, Worldwide Interoperability for Microwave Access (WiMAX), or the like. In one embodiment, the beacon gateway 220 is an electronic device comprising, at least, a Bluetooth antenna 222, transmitter 224, transcoder 226, power manager 228, landline-interface module 230, thin-client module 232, tones generator 234, receiver 236, Bluetooth driver 238, DTMF module 239, operating system 240, and memory 242.

The DTMF module 239 is a piece of software configured to determine what buttons have been pressed by a user on one of the phones connected to the beacon gateway 220. In one embodiment, touch-tone pulses are communicated directly to the beacon gateway 220, which uses the DTMF module to decode them. In another embodiment, a switching center communicates the tone pulses to the beacon gateway 220. Various ways are well known to those skilled in the art for interpreting touch tone pulses; therefore, such techniques need not be discussed at length herein.

The operating system 240 may be any type of operating system capable of supporting software designed to support the inner-working components of the beacon gateway 220. Examples include, without limitation, Linux, Windows XP®, or the like. In some embodiments that incorporate Bluetooth-enabled phones, the operating system 240 includes Bluetooth stacks (e.g., the BlueZ stack supported by Linux) or service packs (e.g., Windows XP Service Pack 2 and later versions) for supporting Bluetooth communications.

The memory 242 comprises any well-known memory storage, including the aforementioned types of computer-storage media. In operation, the memory 242 is configured to store various types of data, including, without limitation, ring tones associated with different phones, dial tones, and system configurations. In one embodiment, each phone is assigned a ring tone, which is stored in the memory 242. When an incoming call is received on one phone, a ring tone associated with the one phone is retrieved from the memory 242 and transmitted, in one embodiment, to the other phones connected to the beacon gateway 220.

The Bluetooth antenna 222, the transmitter 224, and the receiver 236 work together to transmit and receive information from Bluetooth-enabled phones (e.g., the mobile device 101). One skilled in the art will appreciate that numerous antennae, transmitters, and receivers may be used to support communications between the beacon gateway 220 and the mobile device 101. To communicate with the beacon gateway 220, the Bluetooth beacon 218 includes a transmitter that wirelessly communicates information to and from the mobile device 101.

In one embodiment, the Bluetooth beacon 218 transmits data via low-power radio waves on a frequency between 2.40 GHz and 2.480 GHz. Operationally, the Bluetooth antenna 222 receives information that the mobile device 101 wirelessly transmits using a Bluetooth protocol. Bluetooth protocols may include, for example but without limitation, Bluetooth version 1.0, 1.1, or 2.0. The mobile device 101, which is Bluetooth compatible, in one embodiment, interacting with the beacon gateway 220 creates a wireless personal area network (PAN), or "piconet," capable of wirelessly exchanging information between the two devices. The information may include a name associated with the mobile device 101, a device class, a list of services, technical information (e.g., device features associated with the mobile device 101, clock offsets, etc.), voice data, message data, or the like.

The beacon gateway 220 may be equipped, or programmed, with a Bluetooth driver 238 to enable communication with the mobile device 101 via a Bluetooth connection. One skilled in the art will understand that various drivers may be used as necessary.

For security reasons, the Bluetooth beacon 218 may utilize authentication measures using key derivation based on custom algorithms (e.g., the SAFER+ block cipher). In one embodiment, initialization and master keys are generated with the E22 algorithm, and the E0 stream cipher is used for encrypting packets. One skilled in the art will understand that numerous other encryption techniques may alternatively be used.

The mobile device 101 includes executable software, referred to as a thin client 216, which is configured to turn the beacon gateway 220 into a proxy for the mobile device 101 by extending manual control features of the mobile device 101 to the beacon gateway 220. Such features include, without limitation, DTMF signals or digital data grams corresponding to buttons pressed on the mobile device 101 as well as indications that the mobile device 101 has ended a call, switched to another line, or similar functions. While the thin client 216 is illustrated in FIG. 2 as an inclusion in the mobile device 101, embodiments are not limited thereto. Rather, any phone connected to the beacon gateway 220 may contain an instance of the thin client 216. In other words, the VOIP phone 202, landline phone 204, and cable phone 206 may contain the thin client 216. For the sake of clarity, however, the thin client 106 is discussed herein in relation to the mobile device 101.

In one embodiment, the thin client 216 is configured to determine whether the mobile device 101 is in wireless communication (e.g., via Bluetooth) with the beacon gateway 220. In another embodiment, the thin client 216 communicates a phone call made on the mobile device 101 to the beacon gateway 220 for eventual completion through another completed phone. Still, in another embodiment, the thin client 216 completes phone calls made from other connected phones through the mobile device 101. Requests to make phone calls, and other notifications may be communicated to and received from the thin-client module 232 across a Bluetooth connection.

The thin client 216 may be configured to communicate with the thin client module 232, which is software executing on the beacon gateway 220. The beacon gateway 220, in one embodiment, is configured to ring other connected phones to signify an incoming call on the mobile device 101. Or the beacon gateway 220 may communicate calls made on the mobile device 101 to phone networks associated with other connected phones (e.g., the VOIP phone 202 or landline phone 204).

The thin-client module 232 is configured to receive requests to make calls through the mobile device 101. To select a particular phone connected to the beacon gateway 220, a user may cycle through various ring tones by tapping the hook of a phone or selecting a phone presented on a user interface of the mobile device 101. If the mobile device 101 is selected, the thin-client passes the analog signal of an outbound call to the mobile device 101. Before being passed, the analog signal may, in some embodiments, need compressing or decompressing by the transcoder 226.

Additionally, the thin-client module 232 is also configured, in one embodiment, to ring other phones connected to the beacon gateway 220 when an incoming call is received by the mobile device 101 and the mobile device 101 is in communication with the beacon gateway 220. The landline interface module 230 communicates a particular ring tone associated with the mobile device 101 to other connected and available (i.e., not busy) phones. The landline interface module 230 connects the incoming call to the first connected phone answered and uses the thin-client module 232 to support a call with the mobile device 101.

The beacon gateway includes a Bluetooth antenna 22 capable of receiving transmissions from the mobile device 101 via a Bluetooth connection. To support multiple Bluetooth beacons 218, spread-spectrum frequency hopping may be used (in some embodiments) so that beacons do not transmit on the same frequency. To implement such a technique, the mobile device 101 will use several individual, randomly chosen frequencies within a designated range—changing from one to another on a regular basis. For example, the Bluetooth beacons 218 may be configured to change frequencies 1,600 times every second, meaning that multiple mobile devices 101 can make full use of different portions of the radio spectrum.

The beacon gateway 220 may include a number of other components. Well-known software, referred to herein as the transcoder 226, may be included to compress analog, audio signals for transmission. For example, the transcoder 226 may comprise any well-known codec—such as, for example, Speex, Vorbis, WavePack, or the like. Additionally, the power manager 228 is configured to rectify and deliver power carried to various electronics within the beacon gateway 220. One skilled in the art will appreciate the various combinations of circuitry that may be included to power the component of the beacon gateway 220.

In one embodiment, the landline interface module 230 is configured to receive incoming calls to the VOIP phone 202, landline phone 204, and cable phone 206. Additionally, the landline interface module 230 may also be configured to transmit calls through networks connected to the VOIP phone 202, landline phone 204, and cable phone 206.

The tones generator 234 is configured to ring phones connected to the beacon gateway 220. In one embodiment, each connected phone is assigned a particular ring tone. Whenever a call is received on one phone, the tones generator 234 rings the other connected phones with the ring tone assigned to the phone that is receiving the call. For example, if the landline phone 204 receives an incoming call, the landline interface module 230 detects the call, and the tones generator 234 rings the VOIP phone 202 and the mobile device 101 with a ring tone indicative of the landline phone 204. To either the VOIP phone 202, landline phone 204, or the cable phone 206 to ring differently to indicate incoming calls to phones connected to the beacon gateway 220, an instance of the thin client 216 may be installed thereon and managed by the modules in the beacon gateway 220.

One skilled in the art will appreciate that ring tones may be transmitted to the connected phones in a variety of well-known ways. For example, the tones generator may be configured to illicit a switch in the telecommunications network 214 to send a 90V, 20 Hz alternating current (AC) signal to the VOIP phone 202, landline phone 204, or cable phone 206. An RF signal may be sent to the mobile device 101. Other implementations are also possible and are generally well known to those skilled in the art.

The receiver 236 is configured to receive incoming calls from the mobile device 101 via a Bluetooth connection. In other words, the receiver 236 communicates with the Bluetooth beacon 218, which transmits a signal for an incoming call or a call itself to the receiver 236. As previously mentioned, the tones generator signals the VOIP phone 202, landline phone 204, and cable phone 206 that the mobile device 101 is receiving an incoming call. If one of the other connected phones (i.e., the VOIP phone 202, landline phone 204, or cable phone 206) is picked up, the Bluetooth beacon 218 passes the call in real time to the receiver 236. Then, in one embodiment, the transcoder compresses or decompresses the call itself (i.e., the audio conversation between the two phones) and transmits the call to the phone that was picked up. Additionally, the audio signal generated on the other phone (e.g., the receiving user's voice) is sent to the landline interface module 230 and transmitted to the mobile device 101 by the transmitter 224—after any necessary compression or decompression by the transcoder 226—via the Bluetooth connection.

Similarly, incoming calls received by the VOIP phone 202, landline phone 204, or cable phone 206 are communicated to the landline interface module 230. The tones generator 234 can access the memory 242 for the particular ring tone associated with the receiving phone. Once determined, the landline interface module 230, in one embodiment, is configured to ring the other connected phones with the particular ring tone. To communicate the ring tone to the mobile device 101, the landline interface module 230, in one embodiment, checks with the thin-client module 232 to determine whether the mobile device 101 is close enough to communicate with the beacon gateway 220—i.e., whether the mobile device 101 is within the Bluetooth PAN. If so, the particular ring tone is transmitted to the mobile device 101 using the transmitter 224. Furthermore, the landline interface module is configured to communicate the phone call in real time to whichever connected answers the particular ring tone. In the case of the mobile device 101 or the VOIP phone answering, it may be necessary to compress or decompress the call itself (i.e., the analog signal between the two phone callers) in real time sending the call to the answering phone. The transcoder 226 may be used to make such conversions.

In addition to answering incoming calls on connected phones, the beacon gateway 220 also (in one embodiment) enables any of the connected phones to make a call through other connected phones. For example, the landline phone 204 may be used to make a call through the mobile device 101. To select a particular phone, the tone generator 234 is configured to present different dial tones indicative of a particular phone on a phone picked up by a user. To select a particular phone to call through, the user may cycle through the dial tones by tapping the hook switch on the particular phone. For instance, the user may pick up the landline phone 204 and continue to tap its hook switch until a dial tone for the mobile device 101 is presented.

Dial tones may be sent to the VOIP phone 202, landline phone 204, or cable phone 206 using any well-known method. One skilled in the art will appreciate that modern dial tone may vary. For example, a "buzz" of two interfering tones (e.g., 350 Hz and 440 Hz, as defined in the Precise Tone Plan) may be used in accordance with the North America Numbering Plan (NANP). A single, constant tone (e.g., 425 Hz) may be used in European phones. Moreover, a private or internal private branch exchange (PBX) may utilize its own dial tone. As Thus, embodiments are not limited to any particular type of ring tone.

To make a call through from the mobile device 101 through another connected phone, a menu of different connected phones may be displayed on graphical user interface incorporated in the mobile device 101. The user can simply select which phone to make the outbound call through. In one embodiment, busy phones (i.e., phones currently in use) are not shown in the menu or are indicated as in use. Once selected, the outbound call is communicated by the thin client 216, in one embodiment, which is configured to transmit and receive the call and the indicated phone to and from the thin-client module 232. The thin-client module 232 is configured, in one embodiment, to locate the indicated phone and communicate the call thereto. Communication of the call may require the transcoder 226 to compress or decompress analog signals and use the landline interface module 230 to transmit the call to the indicated phone.

Answering an incoming call to the mobile device 101 on the landline phone 204 may occur in the following manner. The inbound call initially rings the mobile device 101. The thin client 216 in the mobile device 101 communicates with the thin-client module 232 on the beacon gateway 220, indicating a call is inbound to the mobile device 101. The tones generator 234 is then called to determine the ring tone stored in memory 242 associated with the mobile device 101. This particular ring tone is then passed by the landline interface module 230 to the remaining phones connected to the beacon gateway 220. When a connected phone is picked up, the two-way audio is passed between the mobile device 101 and the picked-up phone by the landline interface module 230 if answered by a phone other than the mobile device 101 or by the thin-client module 232 if answered by the mobile device 101. Once the answering phone is hung up, the beacon gateway 220 detects either an "on hook" or "end" signal from the answering phone, depending on which phone was picked up. The thin-client module 232 then sends these call-ending indications to the thin client 216, which is configured to communicate an "end" signal to the wireless network.

While the above example discusses an incoming call to the mobile device 101, embodiments are not limited to only passing cell-phone calls to phones connected to the beacon gateway 220. Rather, calls received by the other phones may use similar methods to communicate incoming calls to the other connected phones. For instance, a call to the VOIP phone 202 may result in the landline interface module 230 passing a ring tone indicative of the VOIP phone 202 to the landline phone 204, cable phone 206, and mobile device 101. Moreover, the VOIP phone 202, landline phone 204, and cable phone 206 may include an instance of the thin client 216, although not shown in FIG. 2, that can be configured to communicate the signals, tones, and two-audio discussed herein. One skilled in the art will appreciate that various modules in the beacon gateway 220 may be used to effectuate the results described herein across between each of the phones connected to the beacon gateway 220.

To make a call from the landline phone 204 through the network associated with the mobile device 101, the components of FIG. 2 may be configured to operate in the following manner. Initially, a user picks up the landline phone 204, resulting in an "off hook" signal. The user first hears the normal dial tone associated with the landline phone 204. In one embodiment, this dial tone is sent stored in memory 242 and sent by the landline interface module 230 to the landline phone 204. The user may toggle the hook switch repeatedly to sequence through available phones connected to the beacon gateway 220. Each toggle is interpreted by the landline interface module 230, which is configured to retrieve different dial tones indicative of the different phones connected to the beacon gateway 220. The landline interface module 230 passes each retrieved dial tone to the landline phone 204 for the user to hear. The dial tones indicative of each connected phone are generated by the beacon gateway 222, specifically the landline interface module 230 communicating tones determined by the generator 234.

The user can then make a call through any of the connected phones by dialing a phone number when the user hears a dial tone indicative of a desired phone. The phone numbers are sent to the beacon gateway 220, and the landline interface module 232 is configured, in one embodiment, to detect when a complete phone number has been entered. For example, the landline interface module 230 may be configured to determine that eleven digits have been entered. Once a complete number is detected, landline interface module 230 communicates with the thin client 216 executing on the desired phone. As previously mentioned, any phone connected to the beacon gateway 220 may include an instance of the thin client 216, even though FIG. 2 only illustrates the thin client 216 embodied in the mobile device 101. The thin client 216 pushes the dialed numbers to the wireless network 100 or the network 214, depending on the phone, for completion through the PSTN 118. Moreover, the landline interface module 230 passes two-way audio between the landline phone 204 and the phone selected by the user in real time.

Once the call ends, the user hangs up the landline phone 204 by depressing the hook switch. The landline interface module 230 detects an "on hook" signal and perpetuates the signal to the other phone selected by the user. For the mobile device 101, commands are sent to the thin client 216 to send an "end" call state signal through the wireless network 100. While the above example describes a phone call made from the landline phone 204, any other phone connected to the beacon gateway 220 may be used in a similar manner to call across another network. The mobile device 101 will not communicate with the landline interface module 230; rather, it will utilize the thin-client module 232 in the manners described herein.

The landline interface module 230 and the thin-client module 232 may be configured to determine what phones are connected to the beacon gateway 220 and which phones are available (e.g., not busy, disconnected, or beyond a PAN). To do so, both modules, in one embodiment, are programmed with interrupts that constantly monitor connected phones. If a phone is busy, or otherwise unavailable, its dial tone may not be presented to other phones, and its indication may not be presented on the mobile device 101.

Figures 3, 4:
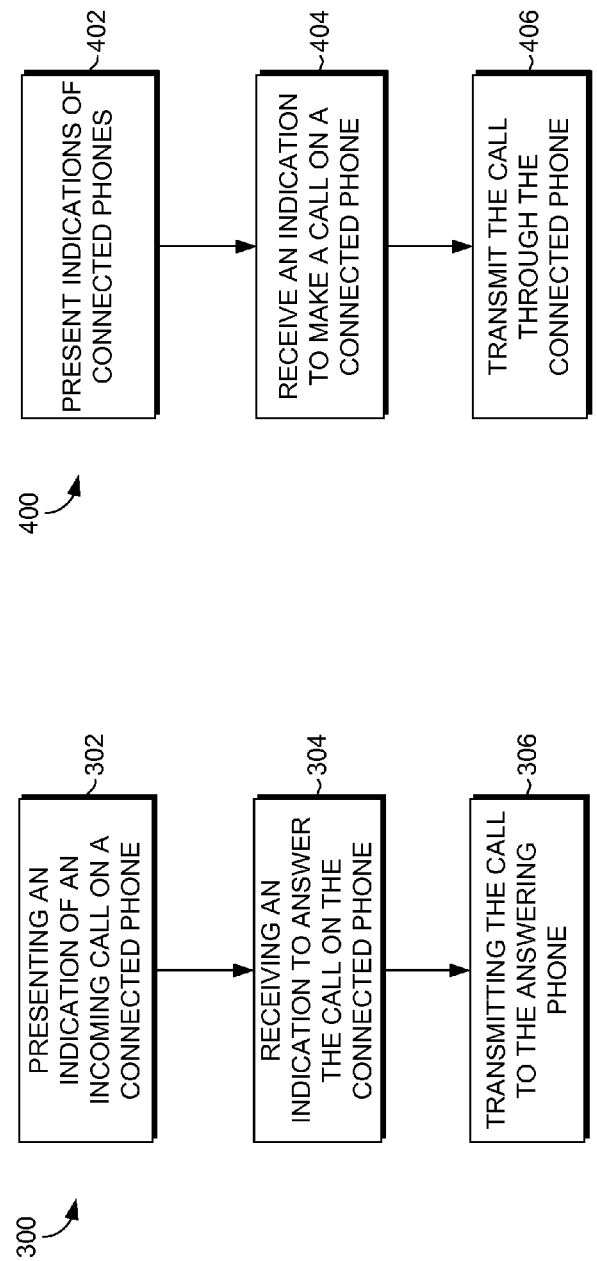
FIG. 3 is a flow chart illustrating a process for receiving an incoming call on one network and communicating the call to a phone on another network, according to an embodiment of the present invention.
FIG. 4 is a flow chart illustrating a process for transmitting an outgoing call on one network and communicating the call to a phone on another network, according to an embodiment of the present invention.

Turning now to FIG. 3, a flow chart is presented illustrating a process 300 for receiving an incoming call on one network and communicating the call to a phone on another network, according to an embodiment of the present invention. Initially, an incoming call is received on one of the connected phones, and a beacon gateway is notified. An indication (e.g., a particular ring tone indicative of receiving phone) of the incoming call is presented on the other phones connected to the beacon gateway, as indicated at block 302. The first connected phone that is answered (i.e., picked up), as indicated at 304, triggers the beacon gateway to transmit the call to the phone, as indicated at block 306. In one embodiment, analog signals associated with the are compressed or decompressed in real time to facilitate the transmission.

Turning now to FIG. 4, a flow chart is presented illustrating a process 400 for transmitting an outgoing call on one network and communicating the call to a phone on another network, according to an embodiment of the present invention. Initially, indications of phones that are connected to a beacon gateway are presented on a connected phone, as indicated at block 402. An indication may include, without limitation, a selectable list of dial tones or a menu in a graphical user interface indicative of the phones available to call through. A user can then indicate which phone to dial through, as indicated at block 404. For example, the user may select to make a call through a landline phone from a mobile device by selecting an icon associated with the landline phone. In another example, the user can repeatedly tap the hook switch of a VOIP phone until the dial tone for a mobile device is presented. Once the desired phone is selected, the user can dial a number, and the beacon gateway is configured to complete the call through the desired, connected phone, as indicated at 406.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable storage having computer-executable instructions embodied thereon that when executed by a computer communicates an incoming call on a first phone to a second phone, the computer-readable media comprising:
   determining whether a plurality of phones are connected to a beacon gateway, wherein the beacon gateway is configured to communicate the incoming call to one of the plurality of phones, and wherein the beacon gateway comprises at least an antenna, a transmitter, a transcoder, a power manager, a landline-interface module, a thin client module, a tones generator, a receiver, and a dual-tone multifrequency (DTMF) module;
   configuring the plurality of phones connected to the beacon gateway, wherein each phone rings with a unique ring tone;
   transmitting the incoming call to an intended destination of the first phone;
   transmitting a ring tone of the first phone such that the plurality of phones connected to the beacon gateway ring with the ring tone of the first phone;
   providing the ring tone to the second phone, wherein the ring tone is indicative of the first phone, such that a user answering the second phone understands the incoming call was originally destined for the first phone.

2. The one or more computer-readable media of claim 1, further comprising a compressing and decompressing an analog signal associated with the incoming call.

3. The one or more computer-readable media of claim 1, further comprising a receiving information regarding the phone call from mobile device.

4. The one or more computer-readable media of claim 1, wherein transmitting the ring tone to the second phone further comprises determining the ring tone from a list of ring tones associated with the plurality of phones.

5. The one or more computer-readable media of claim 1, wherein transmitting the incoming call to a mobile phone if the user answers the incoming call on the mobile device further comprises determining whether the mobile device is in communication via a Bluetooth private area network (PAN) with the beacon gateway.

6. The one or more computer-readable media of claim 5, wherein the thin-client module receives notification of the incoming call from a thin client executing on the mobile device.

7. The one or more computer-readable media of claim 5, wherein a signal associated with the incoming call is received by thin-client module from a thin client executing on the mobile device.

8. The one or more computer-readable media of claim 5, wherein the beacon gateway includes a Bluetooth driver configured to enable the beacon gateway to communicate with the mobile device via a Bluetooth connection.

9. The one or more computer-readable media of claim 1, further comprising determining at least one touch-tone pulse inputted to the first phone by interpreting a dual-tone multifrequency (DTMF) signal.

10. One or more non-transitory computer-readable media having computer-executable instructions embodied thereon that when executed by a computer transmits a phone call over a network, comprising:
- communicating with a plurality of phones, wherein each phone communicates with a beacon gateway, and wherein a first phone communicates with the beacon gateway over a unique communications network different from a second phone that communicates with the beacon gateway;
- presenting a first indication on the first phone, wherein the first indication is indicative of the first phone connected to the beacon gateway using a first communication technology;
- presenting a plurality of indications of other phones at the first phone, wherein the plurality of indications represents features of the other phones;
- receiving an acknowledgement that a user selected the features of a second phone at the first phone;
- presenting a second indication on the first phone, wherein the second indication is indicative of the second phone connected to the beacon gateway using a second communication technology;
- connecting the first phone to a third phone using the features of the second phone to establish the phone call; and
- transmitting one or more signals related to the phone call to the third phone.

11. The one or more computer-readable media of claim 10, further comprising compressing at least one of the one or more analog signals.

12. The one or more computer-readable media of claim 10, further comprising decompressing at least one of the one or more analog signals.

13. The one or more computer-readable media of claim 10, wherein at least one of the one or more analog signals comprises an audio signal of a phone conversation translated in a carrier wave.

14. The one or more computer-readable media of claim 10, wherein the first indication is the result of a user tapping the hook switch of a phone connected to the beacon gateway.

15. The one or more computer-readable media of claim 10, wherein the first indication is the result of a user selecting an indication of the second phone on a graphical user interface.

16. The one or more computer-readable media of claim 10, wherein the second indication is the transmission of multiple touch-tone pulses.

17. One or more non-transitory computer-readable media having computer-executable instructions embodied thereon that when executed by a computer communicates a call, which is incoming to a first phone, to a mobile device, the computer-readable media comprising:
- a thin client, executing on the mobile device, configured to:
- receive an indication of the incoming call from a beacon gateway, wherein the beacon gateway comprises at least an antenna, a transmitter, a transcoder, a power manager, a landline-interface module, a thin client module, a tones generator, a receiver, and a dual-tone multifrequency (DTMF) module;
- receive an indication of a ring tone associated with the first phone;
- present the ring tone; and
- if answered by the mobile device, presenting the incoming call on the mobile device through a telecommunications network associated with the first phone,
- wherein the thin client is executed to turn the beacon gateway into a proxy for the mobile device whereby the control features of the mobile device are provided at the beacon gateway.

18. The computer-readable media of claim 17, further comprising executing the thin client on the mobile device, further configured to:
- transmit an indication to make an outgoing call on the telecommunications network associated with the first phone; and
- communicating the outgoing call to a beacon gateway configured to complete the outgoing call across the telecommunications network.

19. The computer-readable media of claim 18, wherein the first phone is either a VOIP-enabled phone, landline phone, cable phone, or mobile phone.

20. The computer-readable media of claim 17, wherein the first phone is either a VOIP-enabled phone, landline phone, or cable phone.

* * * * *